United States Patent
Saida (10) Patent No.: US 8,875,270 B2
(45) Date of Patent: Oct. 28, 2014

(54) ID AUTHENTICATION SYSTEM, ID AUTHENTICATION METHOD, AND NON-TRANSITORY COMPUTER READABLE MEDIUM STORING ID AUTHENTICATION PROGRAM

(75) Inventor: Yoshinori Saida, Tokyo (JP)

(73) Assignee: NEC Corporation, Tokyo (JP)

( * ) Notice: Subject to any disclaimer, the term of this patent is extended or adjusted under 35 U.S.C. 154(b) by 81 days.

(21) Appl. No.: 13/256,698

(22) PCT Filed: Mar. 24, 2010

(86) PCT No.: PCT/JP2010/002073
§ 371 (c)(1),
(2), (4) Date: Sep. 15, 2011

(87) PCT Pub. No.: WO2010/119626
PCT Pub. Date: Oct. 21, 2010

(65) Prior Publication Data
US 2012/0023561 A1    Jan. 26, 2012

(30) Foreign Application Priority Data
Apr. 15, 2009 (JP) ............................... 2009-098998

(51) Int. Cl.
G06F 21/20 (2006.01)
G06F 21/31 (2013.01)
G06F 21/62 (2013.01)
G06F 21/41 (2013.01)

(52) U.S. Cl.
CPC ............ *G06F 21/31* (2013.01); *G06F 21/6245* (2013.01); *G06F 21/41* (2013.01)
USPC .............................................. 726/8; 726/26

(58) Field of Classification Search
USPC ........................................................... 726/6
See application file for complete search history.

(56) References Cited

U.S. PATENT DOCUMENTS

2002/0122063 A1* 9/2002 Weinberg et al. ............. 345/764
2005/0154913 A1* 7/2005 Barriga et al. ................ 713/201

FOREIGN PATENT DOCUMENTS

JP    2002334056 A    11/2002
JP    2005519365 A     6/2005

(Continued)

OTHER PUBLICATIONS

International Search Report for PCT/JP2010/002073 mailed May 11, 2010.
"Jisedai Ninsho System SKIP9 Tsukaisute no One Time ID de Net Security no Gainen ga Kawaru One Time Password o Koeta Shin Solution", Nikkei System Kochiku, No. 145, Nikkei Business Publications, Inc., Apr. 26, 2005, pp. 170-171.

(Continued)

*Primary Examiner* — Gilberto Barron, Jr.
*Assistant Examiner* — Devin Almeida
(74) *Attorney, Agent, or Firm* — Sughrue Mion, PLLC (57) ABSTRACT

To prevent specification and tracking of a terminal across a plurality of service providers when a user uses a plurality of services. An ID authentication system according to the present invention is an ID authentication system including a terminal apparatus, a service providing apparatus, and an authentication server. A terminal apparatus 100 includes a one-time ID automatic generator 120 for generating a one-time ID, a one-time ID transmitter 130 for transmitting the one-time ID to the service providing apparatus, and a user ID transmitter 140 for transmitting to the authentication server the one-time ID and an ID to uniquely identify a user. An authentication server 200 includes an authentication information manager 220 that stores authentication information of the user used by a plurality of service providing apparatuses. The authentication server 200 transmits to the service providing apparatus 300 authentication information corresponding to the one-time ID to allow the user to log into a service providing apparatus 300.

7 Claims, 5 Drawing Sheets

(56) References Cited

FOREIGN PATENT DOCUMENTS

| | | |
|---|---|---|
| JP | 2005267529 A | 9/2005 |
| JP | 2006004149 A | 1/2006 |
| JP | 2006011989 A | 1/2006 |
| JP | 2006-135431 A | 5/2006 |
| JP | 2008-186201 A | 8/2008 |
| JP | 2008-225573 A | 9/2008 |

OTHER PUBLICATIONS

"Next 1. Jisedai Ninsho (next-generation authentication) System SKIP9 Concept of net security will be changed by disposable one-time ID", Nikkei Solution Business, Apr. 30, 2005, pp. 52-53, No. 223, Nikei Business Publications Inc., Japan.

Japanese Office Action for JP Application No. 2011-509193 mailed on Nov. 19, 2013 with English Translation.

* cited by examiner

| ONE-TIME ID | TERMINAL USER ID |
|---|---|
| a323912z9dw0afcdsl | user001 |
| ... | ... |

Fig. 4

| TERMINAL USER | APPLICATION SERVER IDENTIFIER | SERVER USER ID | PASSWORD |
|---|---|---|---|
| user001 | http://abcde.com | yamada-taro | Xed241w |
| user001 | http://fghij.com | yamada-t | E3vfgf36f |
| ... | ... | ... | ... |

ID AUTHENTICATION SYSTEM, ID AUTHENTICATION METHOD, AND NON-TRANSITORY COMPUTER READABLE MEDIUM STORING ID AUTHENTICATION PROGRAM

TECHNICAL FIELD

The present invention relates to an ID authentication system, an ID authentication method, and a non-transitory computer readable medium storing an ID authentication program, and more specifically, to an ID authentication system, an ID authentication method, and a non-transitory computer readable medium storing an ID authentication program related to authentication of a plurality of service providing apparatuses.

BACKGROUND ART

When using a service provided on a server connected in a network from a terminal such as a personal computer (PC) and a mobile telephone, a user logs into the service with an ID and a password to identify the user himself/herself. Then, the user who is going to use the service is identified by a service provider, which allows the user is able to use the service according to a contract between the user and the service provider.

When using each service provided on a plurality of servers, the user logs into the service with IDs and passwords different for each service. However, since this complicates login procedure, a system called a "single sign-on" may be employed. The "single sign-on" is a system in which, once logging into a service using an ID and a password, the user can log into other services without inputting IDs and passwords again. The system of "single sign-on" is achieved by identification information of the user being shared by the service which the user logged in first and the service which the user logs in next.

Each service provider holds user information corresponding to each user. The user information here includes contract information including the content of the service registered when the user makes a contract with the service provider, personal information including the name, the address, the phone number of the user, and information including an identifier to allow the service provider to identify the user. The service provider manages the user information in association with the ID and the password of the user. Described below are examples in which techniques related to the single sign-on are disclosed.

An authentication system disclosed in Patent literature 1 is configured so that a user terminal holds identification information to identify the user terminal, and an authentication server includes a sign-on management table that stores identification information of the user terminal already subjected to login authentication. When receiving a login request from the user terminal, an application server determines whether the identification information of the user terminal is included in the sign-on management table based on the identification information transmitted from the user terminal. When the identification information is included, the application server determines that the login authentication has been successfully performed; when the identification information is not included, the application server operates to acquire login authentication information from the user terminal. According to such processing, the single sign-on is achieved in the authentication system disclosed in Patent literature 1.

An authentication system disclosed in Patent literature 2 is a login proxy system connected to a plurality of application servers, and includes a login proxy server, an authentication server, and a DB server including a login template table and a URL conversion table. The user logs into the authentication server in the login proxy system in advance. Then, when the user desires to log into the application server from a user terminal, the login proxy server responds to the login request to the application server by the user transmitted from the user terminal to generate a request including login authentication information to the application server by the user using authentication information of the authentication server and the DB server, and logs into the application server in place of the user. For the response sent back from the application server, the login proxy server converts the content using the DB server so as to achieve the same function as a case in which the user terminal directly receives the response from the application server, and sends it back to the user terminal. A single sign-on is thus achieved in the authentication system disclosed in Patent literature 2 according to such processing.

CITATION LIST

Patent Literature

Patent Literature 1
Japanese Unexamined Patent Application Publication No. 2005-267529
Patent Literature 2
Japanese Unexamined Patent Application Publication No. 2002-334056

SUMMARY OF INVENTION

Technical Problem

A problem especially found in Patent literature 1 which is to be solved by the present invention is due to the transmission of unique identification information to a plurality of service providing apparatuses (e.g., application servers) by a terminal. Specifically, when the user uses a plurality of services through a terminal, the terminal and the user that uses the terminal in a single service provider can be specified. Furthermore, specification and tracking of the user and the terminal across a plurality of service providers can be made possible.

More specifically, assume that one user uses a service on an application server A, and inputs personal information including the age, the name, and the address. In such a case, since the identification information of the user is transmitted to the application server A according to Patent literature 1, a service provider a that manages the application server A is able to obtain the identification information of the user in association with the personal information of the user.

Next, assume a case in which the user uses services on application servers B and C, through which the user purchases an article. In such a case, it is possible for the service providers b and c managing the application servers B and C to obtain the identification information of the user (which is the same to the one sent to the application server A) in association with the purchase history by the user.

By exchanging information between the service providers b and c and the service provider a each other, the personal information of the user can be obtained in association with the history information including purchase information using the common identification information, which is a problem in terms of privacy protection of the user.

The present invention has been made in order to solve the problems described above, and aims to provide an ID authentication system, an ID authentication method, and a non-transitory computer readable medium storing an ID authentication program that are capable of achieving a single sign-on which prevents identification of a user among a plurality of service providing apparatuses, and sharing of action history information and the like of the user.

Solution to Problem

An exemplary aspect of an ID authentication system according to the present invention includes a terminal apparatus, a plurality of service providing apparatuses, and an authentication server, in which the terminal apparatus includes: a one-time ID generating means for generating a one-time ID that is temporarily used; a one-time ID transmitting means for transmitting the one-time ID generated by the one-time ID generating means to one of the service providing apparatus; and a user ID transmitting means for transmitting the one-time ID transmitted by the one-time ID transmitting means and a user ID uniquely identifying a user to the authentication server, the service providing apparatus includes an ID inquiry means for receiving the one-time ID transmitted from the terminal apparatus and inquiring of the authentication server about authentication information corresponding to the one-time ID that receives, and the authentication server includes: an authentication information managing means for storing a user ID in association with the authentication information to perform authentication in the service providing apparatus; an ID receiving means for receiving the one-time ID and the user ID transmitted from the terminal apparatus; and a server ID response means for acquiring the user ID corresponding to the one-time ID included in the inquiry from the service providing apparatus from the one-time ID and the user ID received by the ID receiving means, and further acquiring the authentication information associated with the user ID in the authentication information managing means based on the user ID that is acquired, to transmit the authentication information to the service providing apparatus.

An ID authentication method according to the present invention includes generating a one-time ID in a terminal apparatus; transmitting the one-time ID to a service providing apparatus from the terminal apparatus; transmitting the one-time ID and a user ID to uniquely identify a user from the terminal apparatus to an authentication server; receiving, by the service providing apparatus, the one-time ID from the terminal apparatus, and performing processing to inquire of the authentication server about authentication information corresponding to a temporary ID based on the one-time ID; receiving, by the authentication server, the one-time ID and the user ID from the terminal apparatus; acquiring, by the authentication server, the user ID corresponding to the one-time ID included in the inquiry from the service providing apparatus, and further acquiring the authentication information corresponding to the user ID, to transmit the authentication information to the service providing apparatus.

A non-transitory computer readable medium storing an ID authentication program according to the present invention is a non-transitory computer readable medium storing an ID authentication program for executing authentication to allow a user to log into a service providing apparatus, the non-transitory computer readable medium causing an authentication server to execute the following processing of: acquiring a one-time ID and a user ID transmitted from a terminal apparatus; acquiring the user ID corresponding to the one-time ID included in an inquiry from the service providing apparatus that receives the one-time ID from the terminal apparatus, and further acquiring authentication information corresponding to the user ID, to transmit the authentication information to the service providing apparatus for performing a process.

Advantageous Effects of Invention

According to the present invention, it is possible to achieve a single sign-on which prevents identification of a user among a plurality of service providing apparatuses, and sharing of action history information and the like of the user.

DESCRIPTION OF EMBODIMENTS

First Exemplary Embodiment

Hereinafter, exemplary embodiments of the present invention will be described with reference to the drawings.

Figure 1:
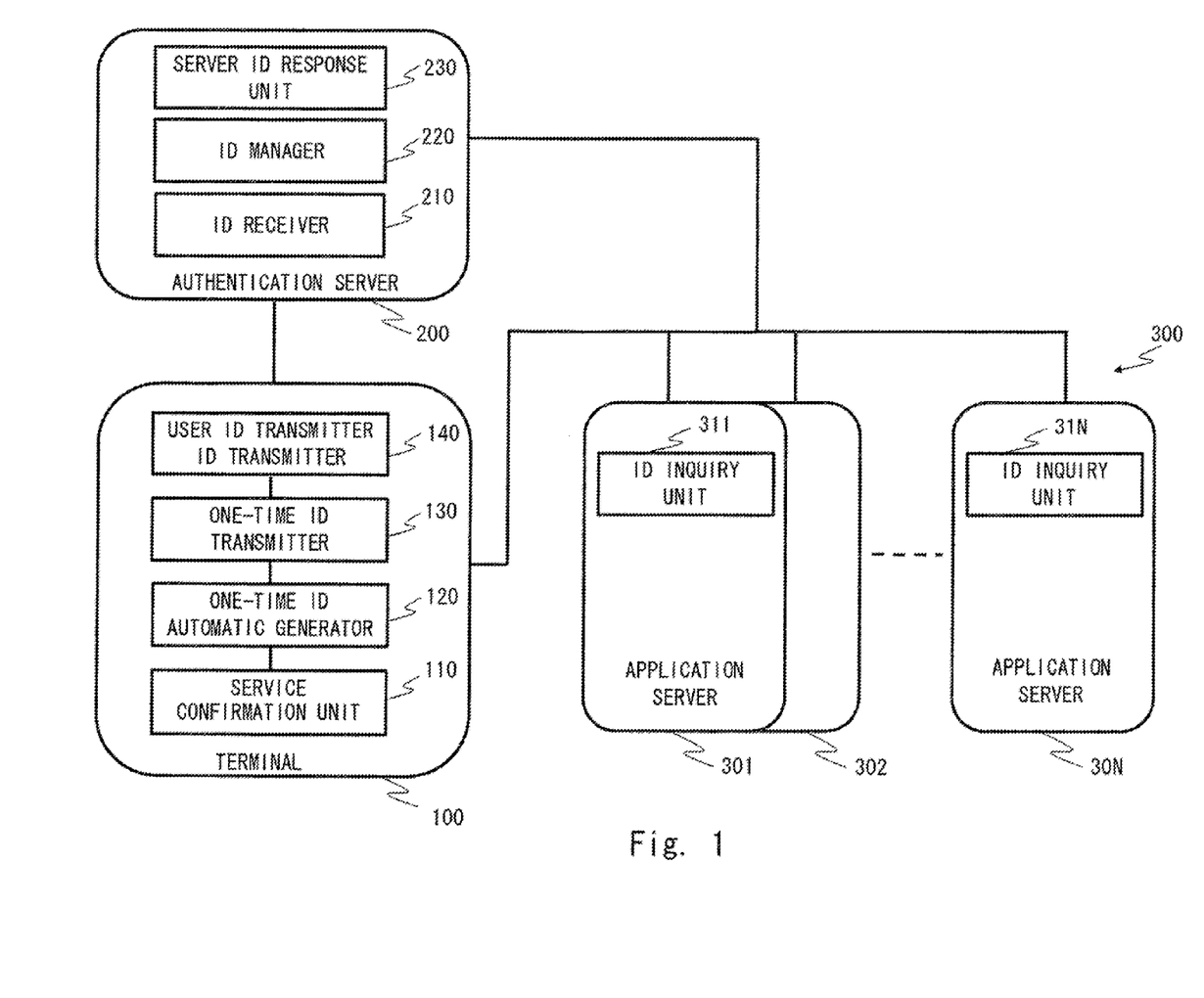
FIG. 1 is a configuration diagram of an ID authentication system according to a first exemplary embodiment.

First, with reference to FIG. 1, a structure of an ID authentication system according to the first exemplary embodiment of the present invention will be described. The ID authentication system includes, as shown in FIG. 1, a terminal 100, an authentication server 200, and a group of a plurality of application servers 300 (301 to 30N). They are connected in a network, and can communicate with one another.

Although the terminal 100, the authentication server 200, and the group of the plurality of application servers 300 have been described as a hardware configuration in the above exemplary embodiment, the present invention is not limited to this example. The present invention may achieve desired processing by causing a central processing unit (CPU) to execute a computer program. In this case, the computer program may be provided by being recorded in a recording medium or may be provided by being transmitted via the Internet or other communication media. Examples of non-transitory computer readable media include flexible disks, hard disks, magnetic disks, magneto-optical disks, CD-ROM, DVD, ROM cartridges, RAM memory cartridges with battery backup function, flash memory cartridges, non-volatile RAM cartridges. Communication media include wired communication media (e.g., electric lines) or wireless communication media (e.g., microwave lines).

The terminal 100 may be a personal computer (PC), a mobile telephone, a personal digital assistant (PDA), for example. The application server group 300 is exemplified as an example of a service providing apparatus, and can be any device that provides any service connected in a network.

The terminal 100 includes a service confirmation unit 110, a one-time ID automatic generator 120, a one-time ID transmitter 130, and a user ID transmitter 140. The authentication server 200 includes an ID receiver 210, an ID manager 220, and a server ID response unit 230. The application server group 300 includes ID inquiry units 310 (311~31N) in the respective application servers.

The service confirmation unit 110 checks whether the application server that is connected this time and a service provided thereon correspond to the ID authentication system. The service confirmation unit 110 is not necessarily provided in a situation in which the whole group of the application servers 300 connected to the authentication server 200 corresponds to the ID authentication system.

The one-time ID automatic generator 120 generates a one-time ID, which is a temporary ID for the connection this time. The one-time ID automatic generator 120 generates different one-time IDs for each connection.

The one-time ID transmitter 130 transmits the one-time ID generated for the connection this time to the application server 300 that is connected this time. The user ID transmitter 140 transmits to the authentication server 200 the one-time ID and a terminal user ID issued in advance to allow the authentication server to recognize the user. This terminal user ID is the identification information to uniquely identify the user, and is a concept including the identification information to identify not only the user as a person but also the group.

The ID receiver 210 receives the one-time ID and the terminal user ID transmitted from the terminal 100, and stores the IDs in a table that manages them.

The ID manager 220 is an authentication information manager that manages, by a table, the authentication information of each application server 300 of the user and the terminal user ID for each user managed by the authentication server 200. The authentication information here is a password, identity information or the like to log into each application server 300.

The server ID response unit 230 receives an inquiry based on the one-time ID described, above from the application server 300, searches the corresponding one-time ID from the set of the one-time ID and the terminal user ID managed by the ID receiver 210, to obtain the terminal user ID that forms the set. After that, the server ID response unit 230 acquires, from the terminal user ID, and the set of the server user ID and the password of each application server 300 managed by the ID manager 220, the password and the server user ID corresponding to the terminal user ID and the application server that made an inquiry, and sends them back to the application server 300.

The ID inquiry unit 310 receives a one-time ID transmitted from the terminal, inquires of the authentication server about the authentication information of the corresponding user using the one-time ID. Then the ID inquiry unit 310 receives the password and the server user ID of the user in response to the inquiry, to execute login processing of the user.

Subsequently, with reference to FIG. 1, a flowchart of FIG. 2, and a sequence diagram of FIG. 3, processing of the ID authentication system according to the first exemplary embodiment of the present invention will be described.

When a user uses a service on the application server 301 among a plurality of services provided on the group of the plurality of application servers 300 using the terminal 100, this system operates according to the following procedure.

Figure 2:
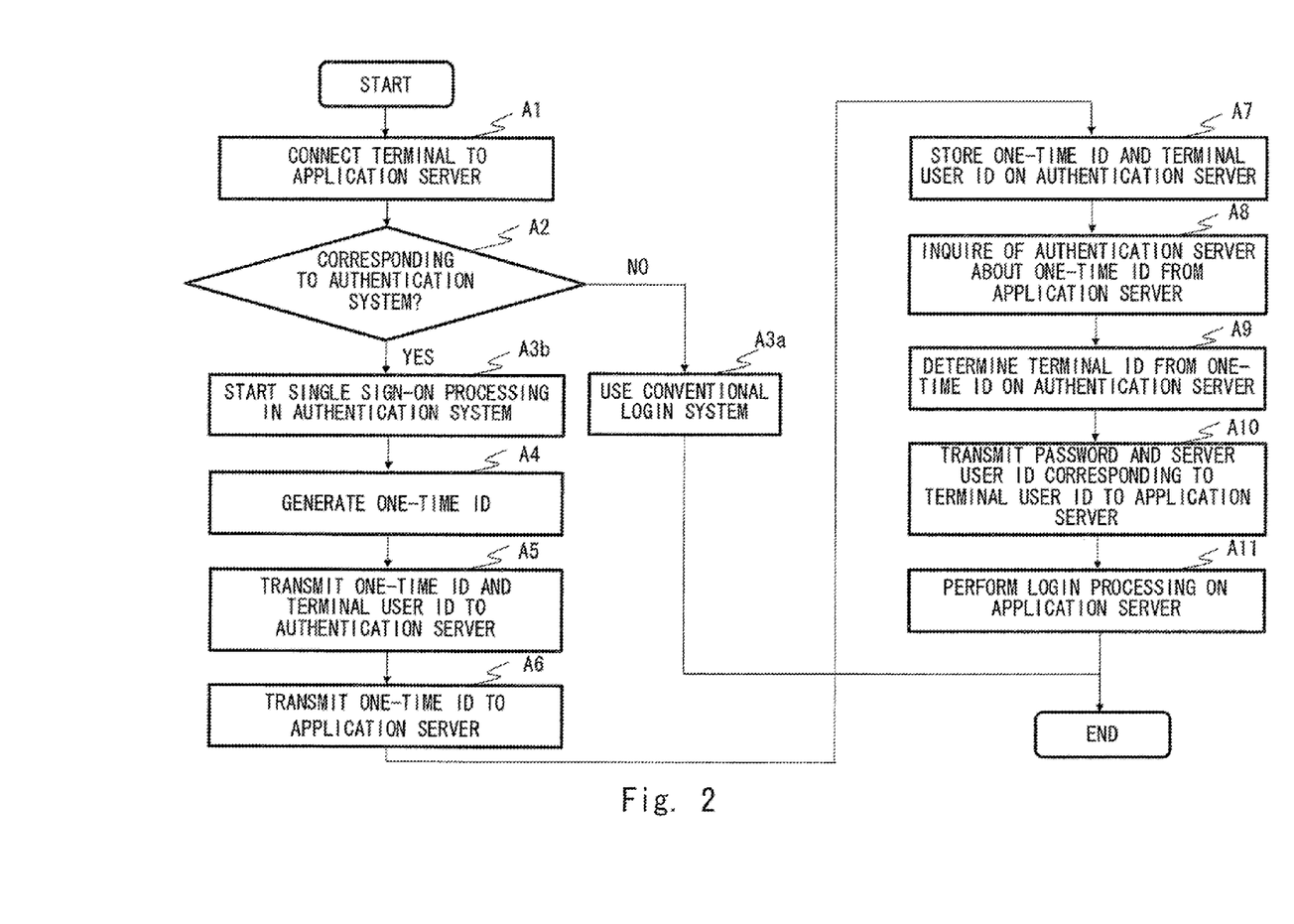
FIG. 2 is a flowchart showing processing of the ID authentication system according to the first exemplary embodiment.
Figure 3:
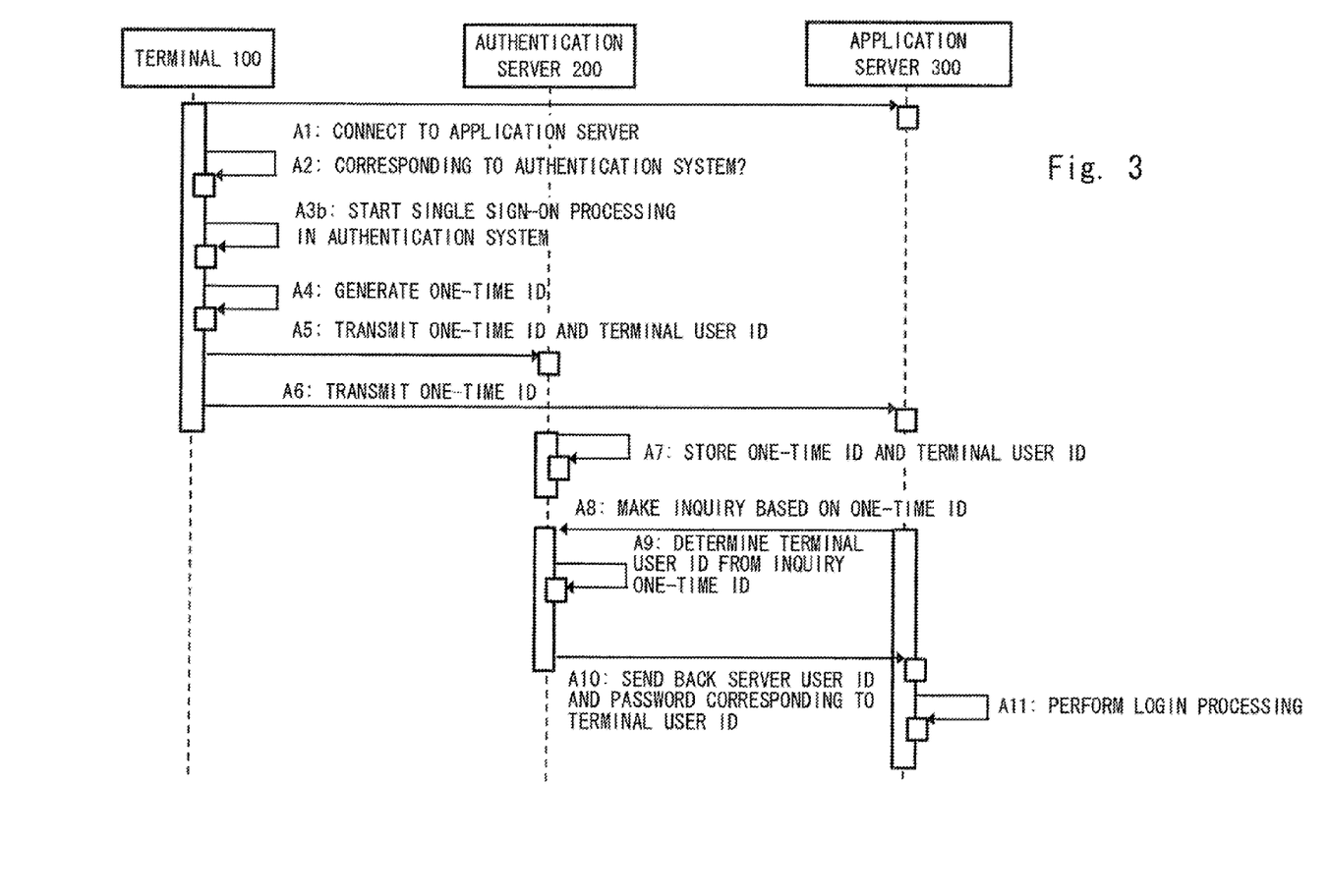
FIG. 3 is a sequence diagram showing processing of the ID authentication system according to the first exemplary embodiment.

The terminal 100 is connected to the application server 301 in a network (step A1 shown in FIGS. 2 and 3). The connection system may use, as an example, a protocol such as a HyperText Transfer Protocol (HTTP), or a HyperText Transfer Protocol Security (HTTPS) for connection.

In this case, the service confirmation unit 110 on the terminal determines whether the service and the server that is connected correspond to the ID authentication system of the present invention (step A2 shown in FIGS. 2 and 3).

One example of this determination procedure may be as follows: a list including a uniform resource locator (URL) and an internet protocol (IP) address of the service and the server corresponding to this system, and a port number at the time of connection is stored in a terminal, and this list is compared with the information of the service and the server connected this time to determine whether it is included in the list.

Another example may be a method of using authentication processing of a digital certificate of a server performed at the time of the HTTPS connection. More specifically, when the service and the server corresponding to the ID authentication system according to the first exemplary embodiment of the present invention are used, a specific character string is embedded in advance as an identifier corresponding to this system into a specific field in the digital certificate of the server. When the digital certificate of the server transmitted from the server that is connected is authenticated on the terminal, it is determined whether the identifier is included.

Another determination method using the authentication processing of the digital certificate of the server includes a method of limiting a certificate authority that issues the digital certificate of the server to a specific certificate authority when the service and the server corresponding to the ID authentication system according to the first exemplary embodiment of the present, invention are used. According to this method, when the digital certificate transmitted from the connected server is authenticated on the terminal, it is determined that the server and the service correspond to this system if the digital certificate is issued by this specific certificate authority.

When the server and the service do not correspond to this system, the user cannot use the authentication function of this system. However, it is possible for the user to use the service by a typical login system in which the user inputs a password and a user ID for the server and the service through a user interface on the terminal (step A3a shown in FIG. 2). On the other hand, when it is determined that the server and the service correspond to this system, the single sign-on processing of the system is started in the following procedure (step A3b shown in FIGS. 2 and 3).

When it is determined that the service and the server connected by the service confirmation unit 110 correspond to this system, the one-time ID automatic generator 120 newly generates a one-time ID for the server and the service connection this time (step A4 shown in FIGS. 2 and 3).

It is preferred that the one-time ID has a sufficient number of digits to prevent generation of the one-time ID for multiple times in the same terminal and accidental generation of the same one-time ID to that in another terminal. Further, the term of validity of the ID may be set as required, which can reduce the possibility that the same one-time ID is generated. Furthermore, this one-time ID may be embedded with the address of the authentication server 200 required in the inquiry procedure of the one-time ID described below.

One example of the one-time ID includes a format like "a323912z9dw0afcdsl@authentication.server.co.jp". The former part "a323912z9dw0afcdsl" before "@" used as a delimiter character is a random character string that is automatically generated, and the latter part "authentication.server.co.jp" after "@" is an address of the authentication server that receives an inquiry about the one-time ID. Although an example of embedding the address of the authentication server into the one-time ID is shown, the address of the authentication server may be adapted to be transmitted separately instead of being included in the one-time ID.

Next, the user ID transmitter 140 transmits to the authentication server 200 the one-time ID generated in step A4 and the terminal user ID issued in advance to allow the authentication server 200 to recognize the terminal user (step A5 shown in FIGS. 2 and 3). It is assumed here that the user ID transmitter 140 transmits to the authentication server 200 "a323912z9dw0afcdsl" as the one-time ID, and "user001" as the terminal user ID.

It is required that the terminal user registers as a user in the authentication server 200 in advance to get the terminal user ID issued to allow the authentication server 200 to recognize the terminal 100 and the user using the terminal 100. Further, the user ID is registered in the terminal user ID transmitter on the terminal 100 in advance, thereby being capable of automatically executing a series of processing without requiring input of the user ID by the user in step A5. The password may be set together with the terminal user ID, and the password may be transmitted to the authentication server 200.

Next, the one-time ID transmitter 130 on the terminal 100 transmits the one-time ID generated in step A4 to the application server 301 (step A6 shown in FIGS. 2 and 3). It is assumed here that the one-time ID transmitter 130 transmits "a323912z9dw0afcdsl" to the application server 301 as the one-time ID.

Figure 4:
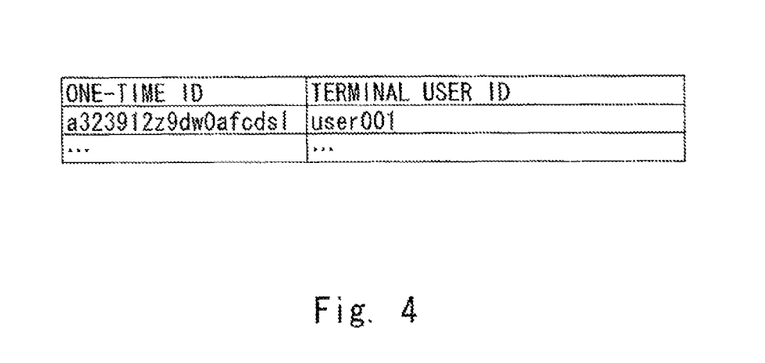
FIG. 4 is a diagram of a management table of a terminal user ID and a one-time ID according to the first exemplary embodiment.

The one-time ID and the terminal user ID transmitted from the terminal 100 to the authentication server 200 in step A5 are received by the ID receiver 210 on the authentication server, and the one-time ID and the user 1D are stored in a table managed by the CD receiver 210 in a pair (step A7 shown in FIGS. 2 and 3). In this example, the ID receiver 210 stores and manages the pair of the one-time ID "a323912z9dw0afcdsl" and the terminal user ID "user001" in the table, as shown in FIG. 4. Although shown in the first exemplary embodiment is the example of managing the one-time ID and the terminal user ID in the table of a database, they may be managed by a main memory unit or the like in a server.

Either the processing by the user ID transmitter 140 to the authentication server 200 (steps A5 and A7 shown in FIGS. 2 and 3) or the processing by the one-time ID transmitter 130 to the application server (step A6 shown in FIGS. 2 and 3) may be performed first. These processing may be concurrently performed.

The one-time ID transmitted to the application server 301 from the terminal 100 in step A6 is received by the ID inquiry unit 311 on the application server 301, and the ID inquiry unit 311 inquires of the authentication server 200 about the authentication information of the terminal user currently connected based on the one-time ID (step A8 shown in FIGS. 2 and 3). In this example, the ID inquiry unit 311 inquires of the authentication server 200 about the authentication information of the terminal user based on the one-time ID "a323912z9dw0afcdsl".

When the address of the authentication server is embedded in the one-time ID, the ID inquiry unit 311 inquires of the authentication server indicated by this address. On the other hand, when the address of the authentication server is transmitted from the terminal 100 separately from the one-time ID, this address is used. When there is no specification of the authentication server from the terminal 100 using these methods, the application server 301 may be provided with the list of the address of the authentication server obtained in advance, with which the inquiry of the ID may be performed.

Upon receiving the inquiry of the authentication information based on the one-time ID from the application server 301, the server ID response unit 230 on the authentication server searches the corresponding one-time ID from the set of the one-time ID and the user ID managed by the ID receiver 210, and acquires the terminal user ID that forms a pair (step A9 shown in FIGS. 2 and 3). Upon receiving "a323912z9dw0afcdsl" as the one-time ID, the server ID response unit 230 searches the table storing the one-time ID and the terminal user ID (FIG. 4), and acquires "user001" as the terminal user ID.

Figure 5:
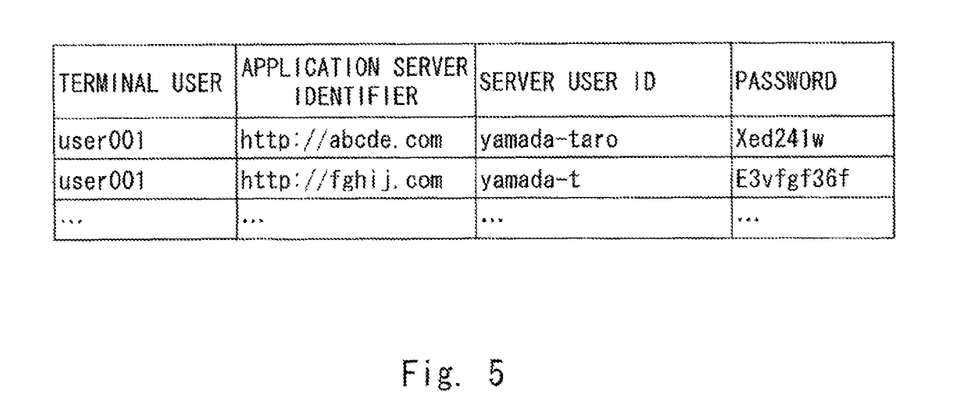
FIG. 5 is a diagram of a management table of a terminal user ID, a server user ID, and a password according to the first exemplary embodiment.

Subsequently, the server ID response unit 230 acquires, from the terminal user ID, and the set of the password and the server user ID of each application server managed by the ID manager 220, the server user ID and the password corresponding to the terminal user ID and the application server 301 that made an inquiry, and sends them back to the application server 301 (step A10 shown in FIGS. 2 and 3). In this example, when the application server 301 is a server having the address of "http://abcde.com", the ID response unit 230 acquires, in response to the inquiry, the password "Xed241w" and the server user ID "yamada-taro" corresponding to the terminal user ID "user001" from the table managed by the ID manager 220 (FIG. 5). After that, the ID response unit 230 transmits the server user ID "yamada-taro" and the password "Xed241w" to the application server 301.

The ID manager 220 on the authentication server manages the set of the server user ID and the password to allow the user to log into the service on each application server by associating the terminal user ID with each terminal user managed by the authentication server (FIG. 5). Although shown above is the example of managing these information in the table of database, they may be managed by a main memory unit in the server. The set of the server user ID and the password is different for each application server, and it is required that the terminal user registers in each application server in advance to get the server user ID and the password issued. Although the authentication information in the first exemplary embodiment is a set of the ID and the password, other authentication information may be used.

The application server 301 that acquires the server user ID and the password performs login processing of the terminal user, and starts providing the service to the terminal user (step A11 shown in FIGS. 2 and 3).

In the first exemplary embodiment, the terminal 100 transmits different one-time IDs for different application servers 300, which makes it possible to prevent identification of a specific terminal user across a plurality of application servers 300 and tracking of the behavior of the terminal user on each application server 300.

Further, when the user uses the application server 300, the authentication server 200 transmits the password and the server user ID of the user corresponding to the application server managed in the authentication server 200 in accordance with the inquiry based on the one-time ID by the application server, thereby achieving the automatic single sign-on which does not require a manual login operation by the user for each application server.

Second Exemplary Embodiment

Figure 6:
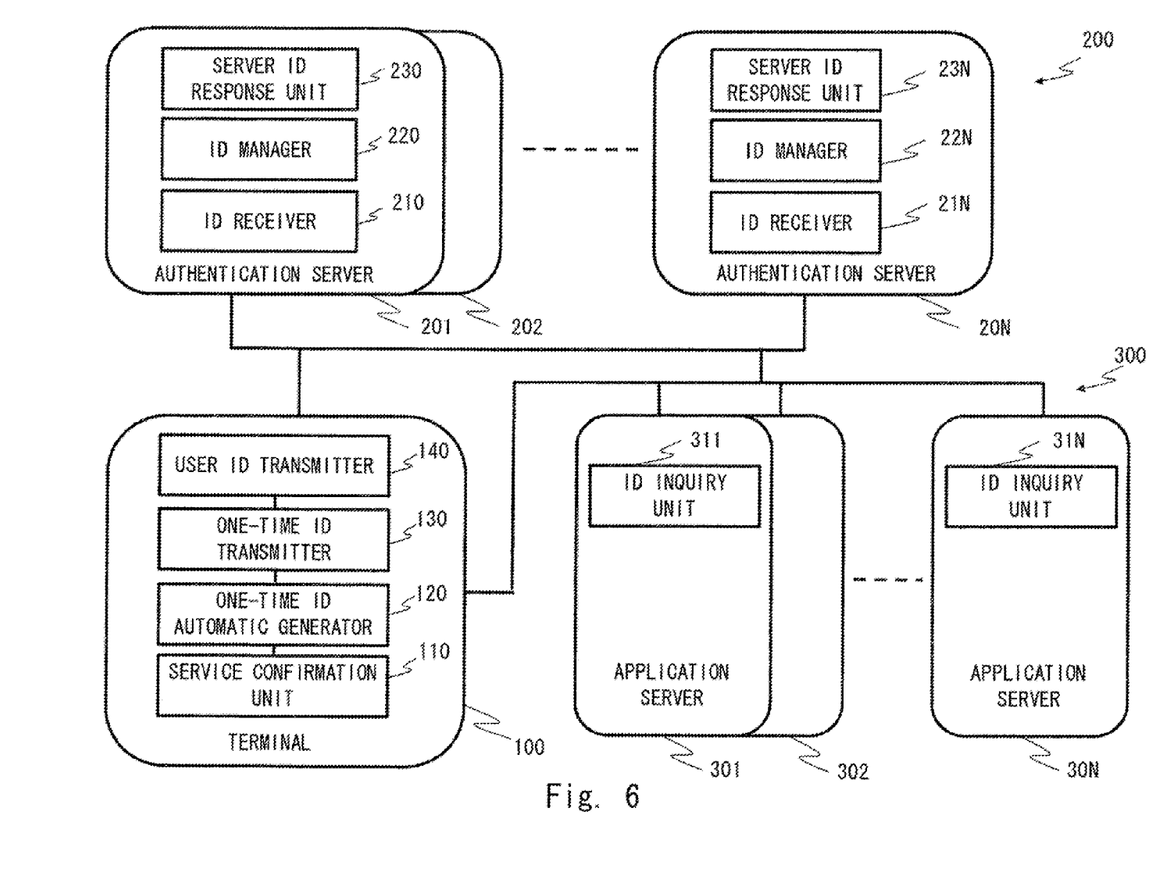
FIG. 6 is a configuration diagram of an ID authentication system according to a second exemplary embodiment.

A second exemplary embodiment of the present invention includes a plurality of authentication servers as shown in FIG. 6. In this case, a terminal user registers as a user in any of a plurality of authentication servers of an authentication server 200 (201~20N) to get a terminal user ID issued in advance. Further, a password and a server user ID to allow the terminal user to log into each application server 300 may be managed by any ID manager of the authentication server in which the terminal user registered as a user.

The operation of the ID authentication system of the present invention in this configuration which is different from that of the first exemplary embodiment will be described.

In step A4 shown in FIGS. 2 and 3, when the one-time ID automatic generator 120 on the terminal 100 generates the one-time ID, an address of the authentication server that is to be inquired this time among a plurality of authentication servers 200 (201~20N) is embedded into the one-time ID. Assume a case in which the authentication server 205 is used this time, and the address of the authentication server 205 is "authentication.server205.co.jp". In such a case, this information is embedded into the one-time ID in a procedure described in the first exemplary embodiment. Alternatively, as described in the first exemplary embodiment as well, the address of the authentication server may be transmitted separately from the one-time ID to the application server.

In step A8 shown in FIGS. 2 and 3, when the application server inquires of the authentication server about the one-time ID using the ID inquiry unit, the application server determines the authentication server that is to be inquired using the address of the authentication server embedded in the one-time ID received by the application server or the address of the authentication server that separately receives, to make an inquiry at the authentication server.

According to this series of processing, the ID authentication system according to the present invention can be operated also in the configuration shown in FIG. 6 including the plurality of authentication servers.

Note that the present invention is not limited to the exemplary embodiments stated above, but may be changed as appropriate without departing from the spirit of the present invention. For example, the terminal user ID may uniquely identify the terminal like a Media Access Control address (MAC address) instead of being provided from the authentication server.

Further, when a user carries a plurality of terminals, these terminals may share the same terminal user ID. For example, when the user carries a PC, a mobile telephone, and a PDA, these terminals may share the same terminal user ID.

This application claims the benefit of priority, and incorporates herein by reference in its entirety, the following Japanese Patent Application No. 2009-098998 filed on Apr. 15, 2009.

Industrial Applicability

The present invention is applicable to electronic commercial transaction systems on the Internet where user authentication is required, for example.

Reference Signs List
100 TERMINAL
200 AUTHENTICATION SERVER
301 TO 30N SERVICE PROVIDING APPARATUS
110 SERVICE CONFIRMATION UNIT
120 ONE-TIME ID AUTOMATIC GENERATOR
130 ONE-TIME ID TRANSMITTER
140 USER ID TRANSMITTER
210 ID RECEIVER
220 ID MANAGER
230 SERVER ID RESPONSE UNIT
310 ID INQUIRY UNIT

The invention claimed is:

1. An ID authentication system comprising a terminal apparatus, a plurality of service providing apparatuses, and an authentication server, wherein
the terminal apparatus comprises:
  a one-time ID generator for generating a one-time ID that is temporarily used;
  a one-time ID transmitter for transmitting the one-time ID generated by the one-time ID generator to one of the service providing apparatus; and
  a user ID transmitter for transmitting the one-time ID transmitted by the one-time ID transmitter and a user ID uniquely identifying a user to the authentication server,
the service providing apparatus comprises an ID inquiry unit for receiving the one-time ID transmitted from the terminal apparatus and inquiring of the authentication server about authentication information corresponding to the one-time ID that receives,
the authentication server comprises:
  an authentication information manager for storing a user ID in association with the authentication information to perform authentication in the service providing apparatus;
  an ID receiver for receiving the one-time ID and the user ID transmitted from the terminal apparatus; and
  a server ID response unit for acquiring the user ID corresponding to the one-time ID included in the inquiry from the service providing apparatus from the one-time ID and the user ID received by the ID receiver, and further acquiring the authentication information associated with the user ID in the authentication information manager based on the user ID that is acquired, to transmit the authentication information to the service providing apparatus,
the one-time ID generator of the terminal apparatus generates the one-time ID including address information of the authentication server,
the service providing apparatus makes an inquiry at the authentication server specified by the address information included in the one-time ID, and
the one-time ID also includes a character string and a domain name which are temporal identification information.

2. The ID authentication system according to claim 1, comprising a plurality of authentication servers.

3. An ID authentication method comprising:
generating a one-time ID in a terminal apparatus;
transmitting the one-time ID to a service providing apparatus from the terminal apparatus;
transmitting the one-time ID and a user ID to uniquely identify a user from the terminal apparatus to an authentication server;
receiving, by the service providing apparatus, the one-time ID from the terminal apparatus, and performing processing to inquire of the authentication server about authentication information corresponding to a temporary ID based on the one-time ID;
receiving, by the authentication server, the one-time ID and the user ID from the terminal apparatus;
acquiring, by the authentication server, the user ID corresponding to the one-time ID included in the inquiry from the service providing apparatus, and further acquiring the authentication information corresponding to the user ID, to transmit the authentication information to the service providing apparatus,
wherein
  the one-time ID comprises address information of the authentication server;
  the service providing apparatus makes an inquiry at the authentication server specified by the address information included in the one-time ID; and
  the one-time ID also includes a character string and a domain name which are temporary identification information.

4. A non-transitory computer readable medium storing an ID authentication program to cause a computer to execute processing for executing authentication to allow a user to log into a service providing apparatus, the non-transitory computer readable medium causing an authentication server to execute the following processing of:

acquiring a one-time ID and a user ID transmitted from a terminal apparatus;

acquiring the user ID corresponding to the one-time ID included in an inquiry from the service providing apparatus that receives the one-time ID from the terminal apparatus, and further acquiring authentication information corresponding to the user ID, to transmit the authentication information to the service providing apparatus for performing a process, wherein the one-time ID comprises address information of the authentication server;

the service providing apparatus makes an inquiry at the authentication server specified by the address information included in the one-time ID; and the one-time ID also includes a character string and a domain name which are temporary identification information.

5. The ID authentication system according to claims 1, wherein the terminal apparatus further comprises service confirmation means for determining whether or not the service providing apparatus or the authentication server can perform authentication corresponding to the one-time ID.

6. The ID authentication system according to claim 5, wherein the service confirmation means holds identification information of the service providing apparatus and the authentication server corresponding to authentication using the one-time ID in advance, and makes a determination according to whether or not the held identification information matches identification information of the service providing apparatus and the authentication server to be connected.

7. The ID authentication system according to claim 5, wherein the authentication server embeds an identifier indicating that authentication corresponding to the one-time ID is to be performed into a digital certificate and issues the digital certificate with the identifier embedded therein, and the service confirmation means makes a determination by using the identifier embedded in the digital certificate.

* * * * *